S. R. BURNETT.
VEHICLE BRAKE.
APPLICATION FILED APR. 12, 1910.
1,008,782.
Patented Nov. 14, 1911.
3 SHEETS—SHEET 1.
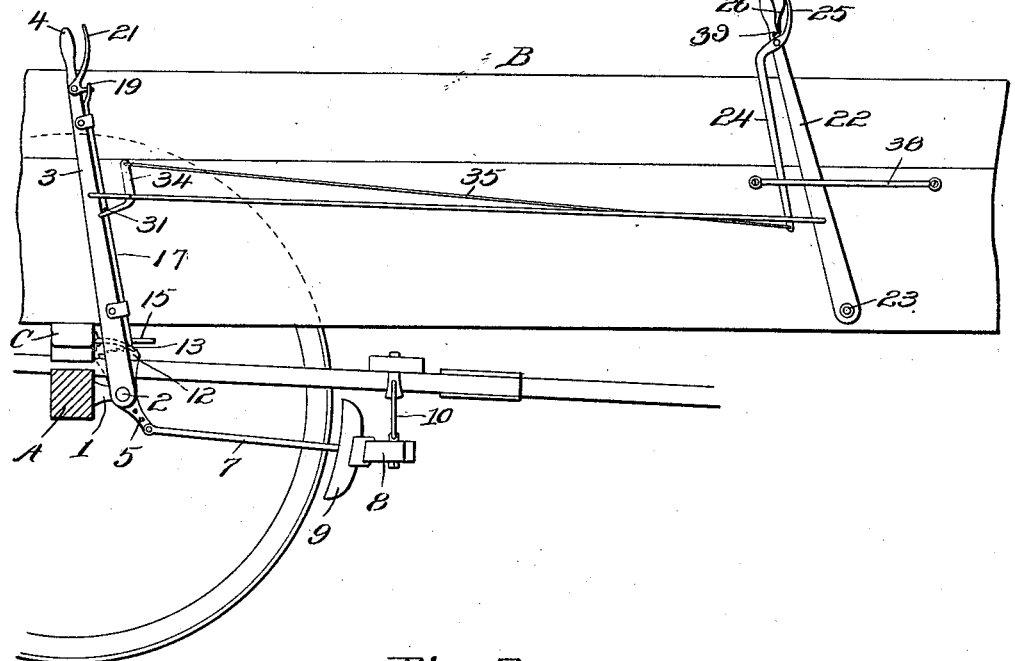
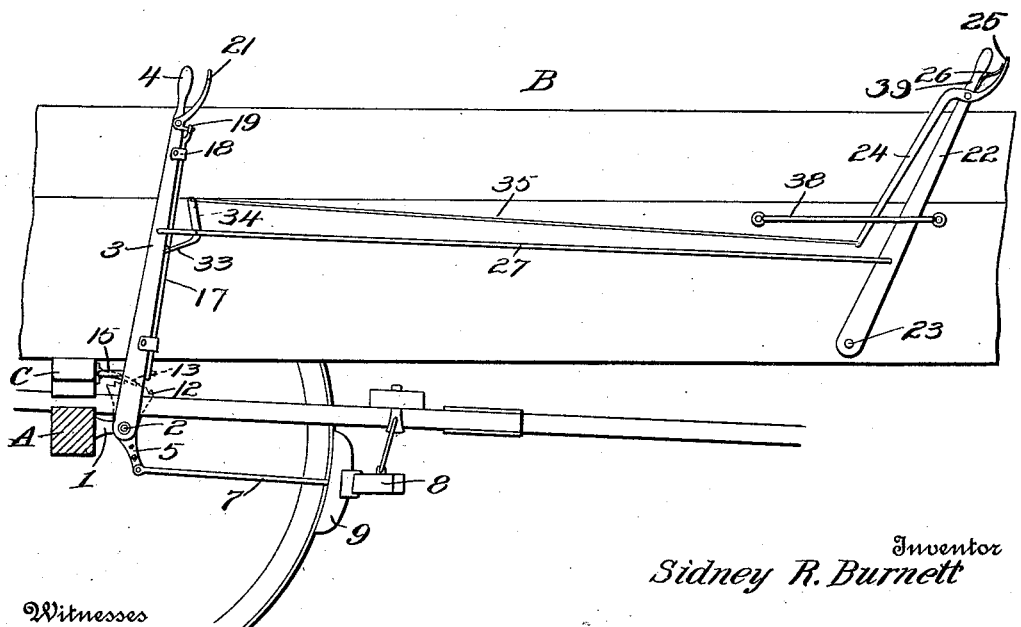
Witnesses
F. C. Gibson
James D. Kochl
Inventor
Sidney R. Burnett
By Victor J. Evans
Attorney

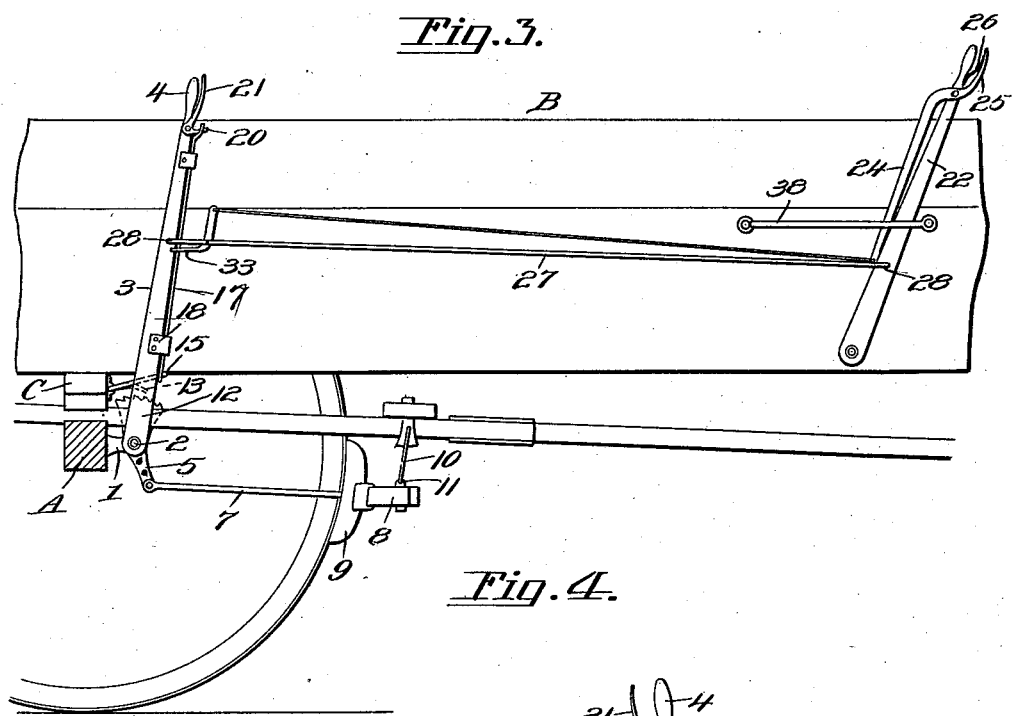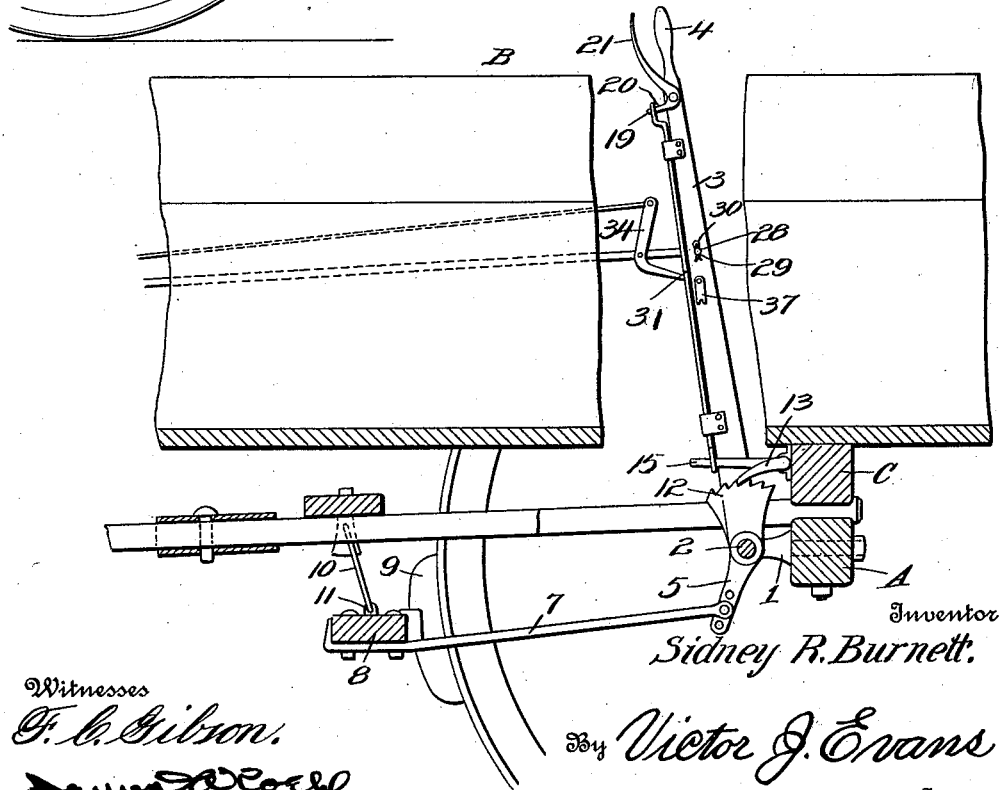

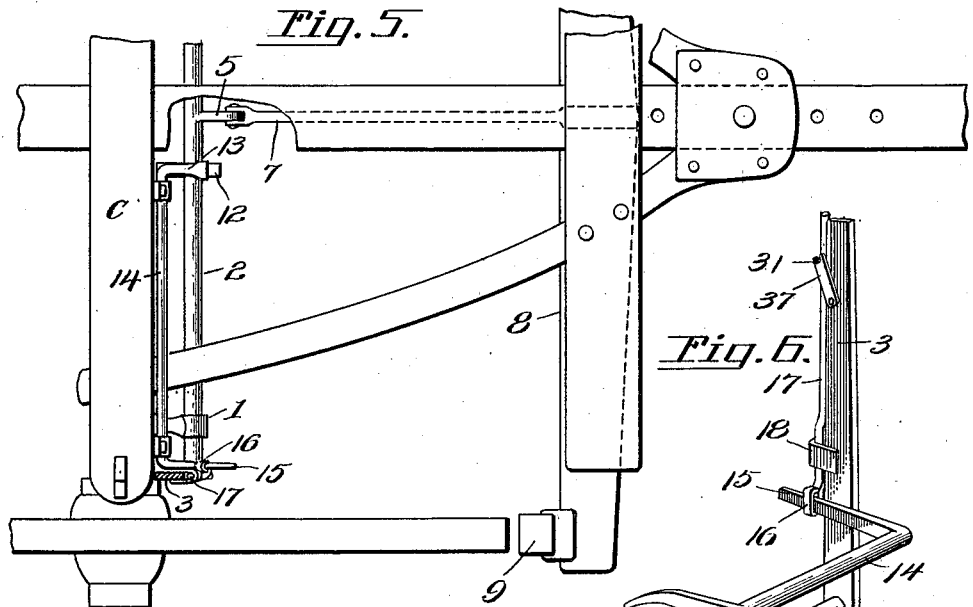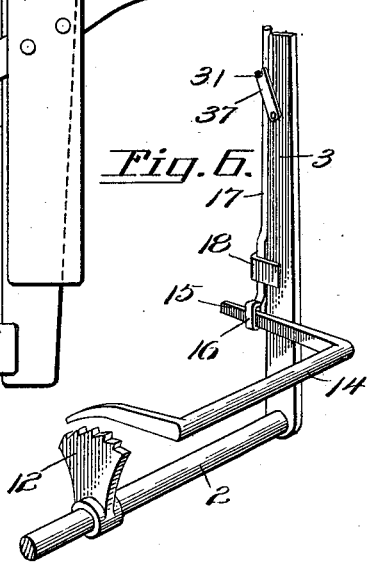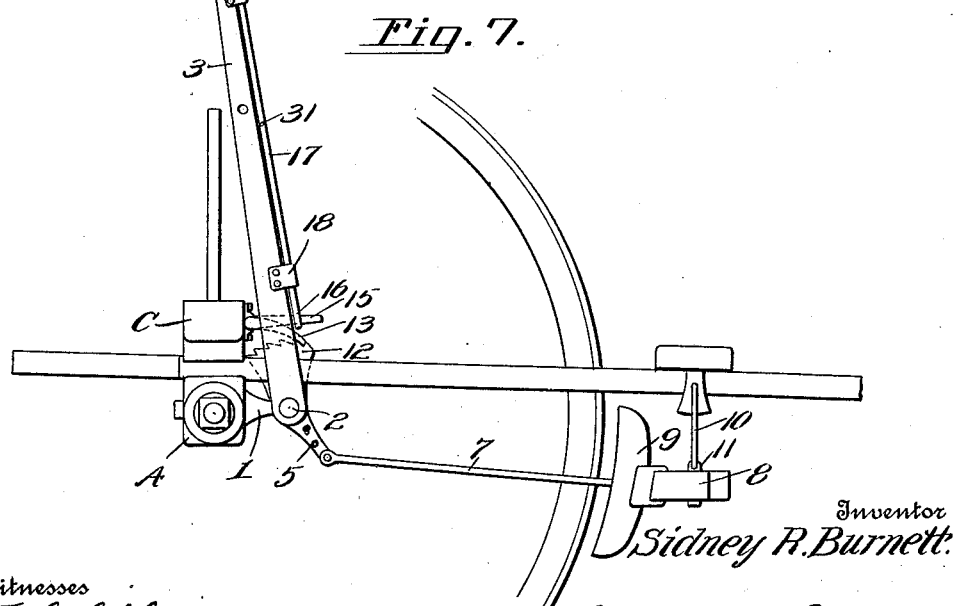

UNITED STATES PATENT OFFICE.

SIDNEY R. BURNETT, OF BODY CAMP, VIRGINIA.

VEHICLE-BRAKE.

1,008,782. Specification of Letters Patent. Patented Nov. 14, 1911.

Application filed April 12, 1910. Serial No. 554,974.

*To all whom it may concern:*

Be it known that I, SIDNEY R. BURNETT, a citizen of the United States of America, residing at Body Camp, in the county of Bedford and State of Virginia, have invented new and useful Improvements in Vehicle-Brakes, of which the following is a specification.

This invention relates to vehicle brakes, and has for an object to provide means whereby the mechanism thereof is adapted for use on an ordinary running gear of a farm wagon and on a wagon not employing the usual bed or body and to also arrange the structure whereby the elements of the brake can be conveniently installed on a wagon employing such bed or body.

A still further object of my invention is to provide lever controlled means at both the front and rear ends of the vehicle and to provide novel ratchet means for holding the brake shoes in their adjusted positions and to further provide effective means on either of the controlling levers for throwing the ratchet mechanism out of operation.

A still further object of the invention is to provide a main controlling lever and an auxiliary controlling lever and ratchet means therefor for holding them in their adjusted positions and to construct the main controlling lever whereby it may be used without the ratchet mechanism if desired.

In the drawings, forming a portion of this specification and in which like numerals of reference indicate similar parts in the several views:—Figure 1 is a side elevation of my improved brake mechanism showing the same operatively applied to a wagon, the controlling levers being in position so that the brake shoes are disengaged from the wheels. Fig. 2 is a similar view showing the controlling levers set to move the brake shoes into engagement with the wheels. Fig. 3 is a side elevation of the vehicle showing the auxiliary controlling lever operated to move the ratchet engaging dog to its disengaged position. Fig. 4 is a detail longitudinal section taken centrally through the rear portion of the wagon. Fig. 5 is a detail plan view of a portion of the wagon with the box removed. Fig. 6 is a detail perspective view of the main controlling lever showing the locking element for holding the pawl-actuating mechanism against movement in one direction. Fig. 7 is a detail side elevation showing the brake mechanism in its applied position upon a wagon not employing a bed or body portion.

My improved brake mechanism consists preferably of bearing members 1 which extend inwardly from the rear axle A of the vehicle shown. These members support a rock shaft 2 which has fixed thereto at one end a main controlling lever 3 which extends upwardly at one side of the vehicle body B so that the handle portion 4 of the lever is in convenient reach of the driver. The rock shaft is provided with a depending arm 5 in which is formed a series of adjusting openings for receiving the pivot bolt at the rear extremity of a link 7. The forward end of this link is operatively connected to a brake beam 8 whose end portions are provided with suitable shoes 9 for engaging the rear wheels of the vehicle. The hounds of the vehicle support suitably spaced links 10 whose lower ends are operatively connected in eye bolts 11 upon the brake beam. This construction is such that when the controlling lever 3 is operated to control the brake beam uniform movement will be imparted thereto and in perfect parallelism to the rear axle A which permits both sides of the brake beam to be applied sumultaneously to the rear wheels of the vehicle as will be understood.

The rock shaft is provided with a suitable segmental ratchet member 12, the toothed surface of which being constructed whereby it may be engaged with a locking pawl 13. This locking pawl is formed to provide a portion 14 which extends longitudinally of the bolster C, and as shown, this portion is mounted in suitable bearings which extend rearwardly from said bolster. The end of the portion 14 opposite the pawl 13 is provided with a crank arm 15 which extends through an eye 16 at the lower end of an actuating rod 17. This actuating rod is slidable in guides 18 on the controlling lever 3 and at the upper end the said rod is offset and formed to provide an elongated slot 19 for receiving the bill 20 of a pivotally mounted lever 21 on the controlling lever 3.

The construction of the actuating rod 17 and the mode of applying it to the main controlling lever 3 are such that the pawl 13 can be conveniently moved away from its co-engaging ratchet element in a rapid and effective manner. An auxiliary controlling lever 22 is mounted at the side of the wagon bed or body and as illustrated, the lower extremity of such lever is pivoted to a bracket 23 which extends from the side of the bed. This lever extends upwardly and is exposed directly in front of the main controlling lever 3. An angle lever 24 is pivoted on the auxiliary lever and it is provided with a handle portion 25 which is disposed directly in front of the handle portion of the said auxiliary controlling lever and as illustrated, the handle portion of each of such levers are connected by the spring or equivalent elastic element 26 which normally exerts its tension to hold the handle portion of the said angle lever away from the handle portion of the auxiliary controlling lever. The auxiliary controlling lever is connected to the main controlling lever by a rod 27 whose ends are formed to provide fingers 28 which fit in correspondingly formed apertures in the controlling lever. The fingers 28 are formed to provide apertures 29 for the reception of suitable removable retaining keys 30. The pawl actuating rod 17 is provided with a lateral pin 31, the terminals of which project on opposite sides of said rods 17, and said pin is disposed directly above the lower or actuating portion or arm 33 of the angle lever 34. This angle lever is pivoted as shown, to the rod which connects the main controlling lever with the hereinbefore described auxiliary lever and the short arm of the said angle lever is pivoted to one end of a link 35, the opposite end of the said link being pivoted to the long or upper arm of the angle lever on the auxiliary controlling lever.

The main controlling lever 3 is provided at one side with a pivoted keeper or locking element 37 which may be engaged with the pin 31 of the pawl actuating rod 17 so as to hold the pawl actuating rod against movement in one direction. This is desirable when the controlling lever 3 is applied to the wagon without employing the ratchet element for engaging the locking pawl. One side of the wagon body is formed to provide a longitudinally extending guide 38 for the auxiliary controlling lever, as is obvious. By providing the arm 5 of the rock shaft 2 with a series of adjusting openings it will be readily understood that the adjusting bolt which connects the link 7 with the said arm 5 can be adjusted to regulate the throw of the brake beam.

The construction of the brake mechanism hereinbefore described is such that it may be conveniently applied either to a wagon with the usual bed or body portion or if desired the auxiliary controlling lever may be disconnected from the main controlling lever and the latter used alone, furthermore, should it be desired the main controlling lever, as stated, may be used without a ratchet mechanism for holding the brake shoes in their adjusted positions. The construction is such that both the main and auxiliary levers can be controlled simultaneously and each is provided with means operable to move the pawl 13 away from the ratchet element when it is desired to disengage the brake shoes from the rear wheels of the wagon. It may be stated that when both levers are employed and it is desired to control movement of the brake beam through the medium of the auxiliary controlling lever, the angle lever 24 can be actuated to impart movement to the angle lever 34 so that the portion 33 thereof is moved against the pin 32 to elevate the pawl actuating rod 17. Sliding movement in an upward direction of the pawl actuating rod effectively operates to move the pawl to its disengaged position from its ratchet element. To limit pivotal movement in one direction of the angle lever 24 on the auxiliary lever a stop pin 39 is employed which extends from the auxiliary lever in the path of movement of the angle lever.

I claim:—

In combination with a vehicle having a rear axle and wheels journaled thereon, supports secured to the axle and extending forwardly thereof, a rock shaft journaled on the supports and provided with a crank arm, links supported on the vehicle forwardly of the wheels, a brake beam pivoted to said links and provided with brake shoes on its ends to engage the wheels, a link connected with said brake beam and with the crank arm of the rock shaft, a lever secured to said rock shaft and extending thereabove, a pawl pivoted to the vehicle above the axle and extending forwardly of said axle, a segmental ratchet secured to the rock shaft and adapted to be engaged by the pawl, an arm connected with the pawl and extending forwardly of the axle, guides secured to the lever, a rod slidable in the guides and having an eye on its lower end secured to the arm of the pawl, said rod being provided with lateral pins, a second lever pivoted forwardly of the first lever to the vehicle, a link rod connecting said second lever to the first lever, a lever pivoted to said link rod and adapted to engage the lateral pins of the pawl operating rod, a link connected with the last lever, a member pivoted to the second lever and connected with said second link rod, and a member connected with the first lever and adapted to engage the rod carried by said first lever.

In testimony whereof I affix my signature in presence of two witnesses.

SIDNEY R. BURNETT.

Witnesses:
G. B. UPDIKE,
A. G. HILLSMAN.

Copies of this patent may be obtained for five cents each, by addressing the "Commissioner of Patents, Washington, D. C."